H. E. MacLAUGHLIN.
OPTICAL TEST INSTRUMENT.
APPLICATION FILED MAY 23, 1910.
994,082.
Patented May 30, 1911.
2 SHEETS—SHEET 1.
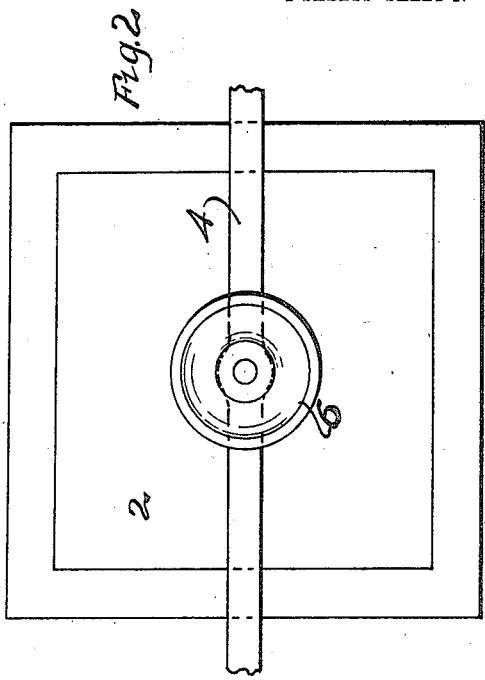
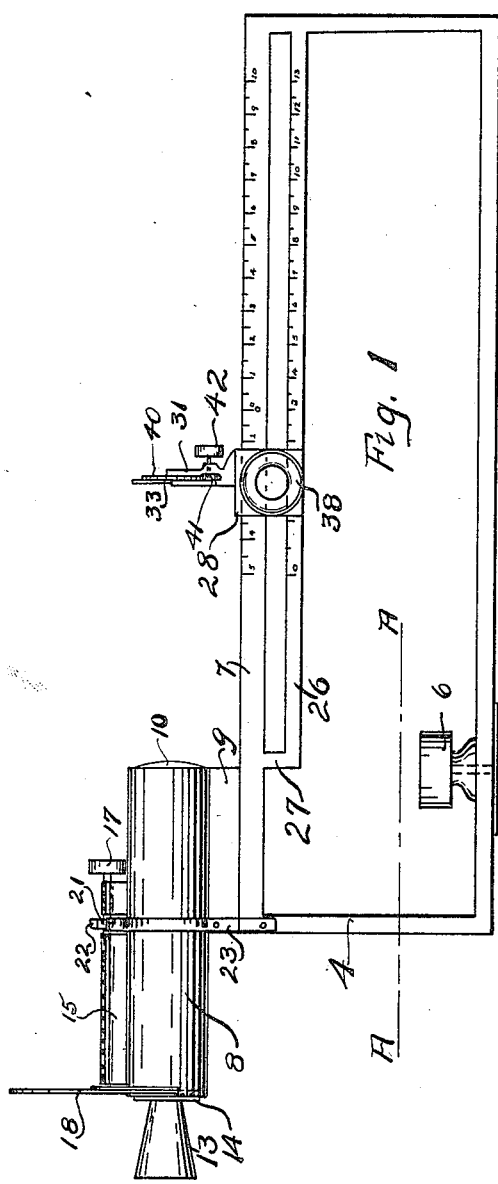
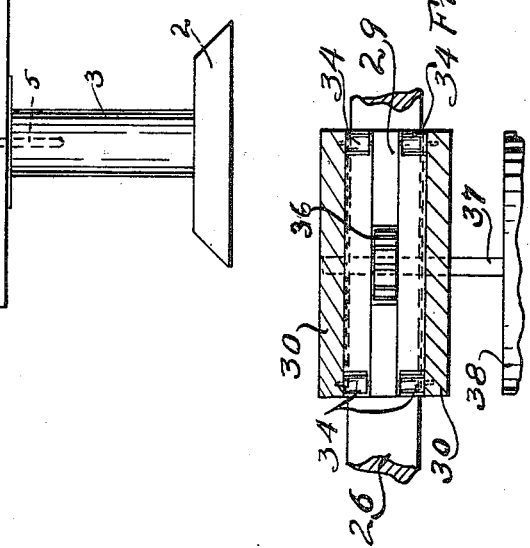
Witnesses:
Jule Donovan.
Paul S. Smith
Inventor:
Harry E. MacLaughlin
by H. S. Bradbury.
Attorney.

H. E. MacLAUGHLIN.
OPTICAL TEST INSTRUMENT.
APPLICATION FILED MAY 23, 1910.
994,082.
Patented May 30, 1911.
2 SHEETS—SHEET 2.
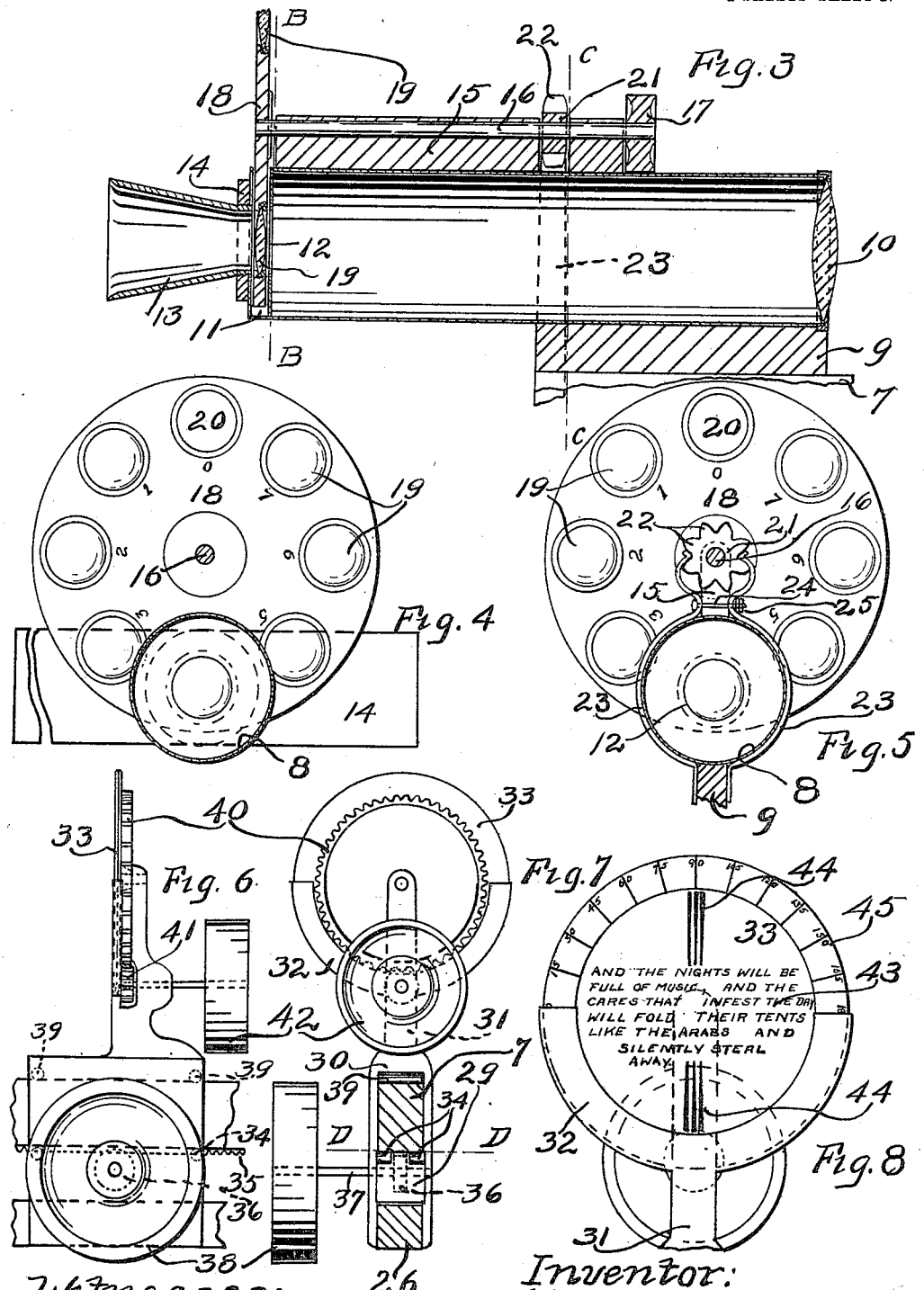
Witnesses:
Jule Donovan.
Paul S. Smith.
Inventor:
Harry E. MacLaughlin
by; H. S. Bradbury.
Attorney.

UNITED STATES PATENT OFFICE.

HARRY E. MacLAUGHLIN, OF WILLMAR, MINNESOTA.

OPTICAL TEST INSTRUMENT.

994,082.            Specification of Letters Patent.     Patented May 30, 1911.

Application filed May 23, 1910. Serial No. 562,841.

*To all whom it may concern:*

Be it known that I, HARRY E. MACLAUGHLIN, a citizen of the United States, residing at Willmar, in the county of Kandiyohi and State of Minnesota, have invented a new and useful Improvement in Optical Test Instruments, of which the following is a specification.

My invention relates to improvements in optical test instruments for detecting abnormal optical structure and action of the human eye.

My object is to secure an instrument that will be simple, compact and easily manipulated, affording in one device a combination of the common eye tests used by opticians, including color perception, chromo aberration, astigmatic axes, and range of accommodation, and providing especially for a positive and accurate determination of the visual acuity of any eye. The device by which I secure this object is illustrated in the accompanying drawings which form part of my specification and of which—

Figure 1 is an elevation; Fig. 2 is a plan section on the line A—A of Fig. 1; Fig. 3 is a sectional elevation of the sight piece; Fig. 4 is a section on the line B—B of Fig. 3, showing the auxiliary test lenses; Fig. 5 is a section on the line C—C of Fig. 3 showing the lens centering device; Fig. 6 is an enlarged view of the target and target stand; Fig. 7 is a back view of the target; Fig. 8 is a front view of the target face, and Fig. 9 is a section on the line D—D, of Fig. 7.

In the above illustrations 2 is a base plate which may be fastened to a table by screws. Fixed to this base plate is a shaft or spindle 3 on the top of which is mounted a frame 4 revoluble in a horizontal plane upon the shaft 5 of the set screw 6 which may be used to fix the frame in any horizontal position. Above the top bar 7 of the frame 4 is mounted the sight piece 8. The block 9, fastened to the frame 4 elevates the sight piece above it.

The sight piece 8 consists of a hollow tube having mounted in the end which is above the frame, an object lens 10, the axis of which coincides with the axis of the tube, and in the other end, a cell 11 with an eye port 12 in its walls upon the axis of the tube. A single eye piece 13 is mounted on the end of the sight piece 8 on the axis thereof, in connection with a shield 14 which extends at right angles on both sides of the eye piece and is fitted to obscure the vision of one of the patient's eyes during the examination of the other which is applied to the eye piece for that purpose.

Upon the sight piece 8 is fixed a block 15 in which is mounted a shaft 16 carrying at one end the thumb head 17 and at the other, a lens carrying disk 18 which revolves in the cell 11 and in which are mounted a plurality of lenses 19 of different strengths and colors and an open lens port 20. The lens carrying disk rotates at right angles to the axis of the tube and the lenses are so mounted in the disk that the rotation of the disk by the thumb head 17 causes the axes of the successive lenses to coincide with the axis of the tube of the sight piece 8, and therefore with the axis of the lens 10, and the eye port 12 in the cell walls.

On the shaft 16 carrying the lens holding disk 18 is mounted the sprocket wheel 21 having the same number of teeth 22 that there are lens ports in the disk 18. In the interstices between these teeth and on opposite sides of the sprocket, are lodged the ends of two springs 23 which are fastened to the top bar 7 of the frame 4, embrace the tube of the sight piece 8 and are fastened together above the sight piece by a bolt 24 having set nuts 25 by which the engagement of the spring ends with the teeth of the sprocket may be adjusted. The sprocket wheel 21 is so placed on the shaft 16 that the springs engage the sprocket wheel and force the shaft and lens carrying disk upon it into such a position that the lenses in the disk register with the port 12 in the cell wall. As the disk is rotated, carrying successive lenses past the port, the springs are spread apart by the teeth of the sprocket until they enter the next recess when they at once tend to force the disk into a new position of registry. It will be seen that this device provides a positive centering for each of the lens ports at the eye port.

Below the top bar 7 and extending from below the objective end of the sight piece to the extreme end of the frame 4 is a scale bar 26 connecting to the top bar by a drop piece 27 and to the end of the frame. Upon the top bar 7 and scale 26 is mounted the target frame 28 consisting of a block 29 sliding between the top and scale bars, a yoke 30 mounted on this block, a target stand 31 upon the yoke, a semicircular shield 32 integral with the target stand, and a revolving target face 33 firmly mounted on the stand and in the shield. In the upper face of the block 29 are four rollers 34 bearing upon the under surface of the top bar 7 at the sides of the rack 35 which occupies the middle portion of the under surface of the top bar. In the block 29 is mounted the pinion 36 engaging the rack 35. The shaft 37 carrying the pinion 36 passes through the block 29 and the yoke 30 and carries the thumb head 38 by which the pinion 36 may be rotated and the target advanced along the top bar of the frame. Mounted in the yoke 30 are two rollers 39 bearing upon the top face of the top bar 7. The rollers 34 and 39 embrace the top bar closely so that there may be no play in the target and the yoke 30 closely embraces the sides of the bars 7 and 26 for the same purpose.

At the back of the target face 33 and revoluble with it, is a gear 40, engaging which is a pinion 41 mounted in the target stand 31 and operated by a thumb head 42. On the target face 33 are characters 43, lines 44 and an angular scale 45. When the target face is in its normal position, the points of the scale reading zero and 180 degrees, register at the ends of the semicircular shield 32 and on the horizontal axis of the target face. The characters 43 occupy the central portion of the target face parallel to its horizontal axis and the lines 44 occupy the top and bottom segments of the target face symmetrically about the vertical and horizontal axes. The lines 44 taper uniformly from their circumferential to their central ends, their sides being substantially radial to the center of the target face. The characters 43 and the lines 44 are designed to contrast sharply with the back ground of the target face for purposes of distinct vision.

On the lateral sides of the top bar 7 and scale bar 31, are inscribed scales having divisions in units of refraction and having their zero point definitely fixed with relation to the principal focus of the object lens 10 in the sight piece 8.

In operating my device the ophthalmic patient is placed in front of the eye piece 13 with one eye close thereto upon the axis of the sight piece. The vision of the patient's other eye is obstructed by the eye shield 14. The open port 20 in the lens carrying disk 18 is placed in registry with the port 12 in the cell walls of the sight piece, and such tests as may be desired are then made of the patient's vision focused upon the movable target, at the different positions of which readings may be taken from the different scales upon the scale bars for purposes of diagnosis. In connection with the object lens 10 the different supplemental test lenses may be used for the purpose of fogging or clearing the patient's vision, the substitution of the different supplemental lenses being affected by the rapid turning of the thumb head 17. In connection with tests for astigmatism, a cobalt blue glass or lens in the lens carrying disk may be used to give the well known chromo aberration test. In testing for the astigmatic axis of an abnormal eye, the face of the target may be revolved by the thumb head 42 to find the line of perfect vision and the angle of this axis may be read upon the scale 45 on the target face. Lenses or glasses having the colors of the usual color tests may be rotated before the patient's eyes for the purpose of observing abnormal color sense. Any or all of these tests may be used at the discretion of the physician operating my device, and from the accuracy of the results which can be obtained by the use of my device, an unusually correct diagnosis of abnormal eyes may be made.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. An instrument of the class set forth, comprising, in combination, a graduated scale, a sliding target, a tubular sight piece in alinement with said target, an eye piece at one end of said sight piece adapted to direct the vision of the eye along the axis of said sight piece, an object glass at the other end of said sight piece, an auxiliary lens carrier rotatably mounted on said sight piece and adapted to present a series of auxiliary lenses at the eye piece and in alinement with the axis of the sight piece.

2. An instrument of the class set forth, comprising, in combination, a supporting frame, a tubular sight piece mounted on said frame, a target slidable on said frame, two scale bars between which the supporting body of said target slides and having two scales with which said target registers said scales being adapted to indicate in optical units the distance of the target from the eye piece, and means for operating said target longitudinally of said bars.

3. A slidably mounted test target for an optometer, comprising, a scale bar on said optometer, a body part for said target embracing said scale bar and slidable thereon, means for moving said body along said scale bar, a standard mounted on said body, a disk revolubly mounted on said standard to rotate in a plane at right angles to said scale bar, an arcuate scale mounted on said standard and adapted to indicate the angular rotation of said disk, and a pinion journaled in said standard and adapted to rotate said disk, for the purposes set forth.

4. In an instrument of the class set forth, a supporting frame, a scale bar and a target slidably mounted on said frame, a telescope mounted on said frame with its axis in alinement with the movement of said target, a fixed object lens in said telescope and adjustable eye piece lenses, said adjustable lenses comprising a plurality of auxiliary lenses of different focal length mounted in a rotatable disk and adapted to be rotated into alinement with the axis of the telescope, a ratchet wheel attached to said disk on its axis and having teeth adjusted to the position of the auxiliary lenses on the disk, a pair of opposite springs mounted on said frame and adapted to engage said ratchet teeth when the individual lenses are in alinement with the axis of the telescope, and means for rotating said disk.

5. An instrument of the class set forth, comprising, in combination, an upright post having a base adapted to be attached to a table or other support, a substantially rectangular frame rotatably mounted on one of its sides upon said post to revolve in a horizontal plane and adapted to be fixed in any angular position, a scale bar adjacent to the other side of said frame and supported thereon, a target stand in connection with said scale bar and said frame, slidable thereon and adapted to be fixed in any position longitudinally thereon, scales on said scale bar and adjacent frame side, adapted to indicate the position of said target stand, a revoluble target mounted on said stand in a plane at right angles to the slidable movement of said target stand, and an observing telescope mounted at one end of said frame, its visual axis being directed on said target and parallel to the line of movement thereof.

In testimony whereof, I have signed my name to this specification, in the presence of two subscribing witnesses.

HARRY E. MacLAUGHLIN.

Witnesses:
GEO. H. OTTERNESS,
J. P. JYDSTRUP.

Copies of this patent may be obtained for five cents each, by addressing the "Commissioner of Patents, Washington, D. C."